United States Patent [19]
Kimura et al.

[11] Patent Number: 5,835,499
[45] Date of Patent: Nov. 10, 1998

[54] DATA PROCESSING DEVICE FOR FM MULTI-CHANNEL BROADCASTING

[75] Inventors: Kazuhiro Kimura; Shigeaki Hayashibe; Toshiyuki Ozawa; Tatsuo Hiramatsu; Yoshikazu Tomida, all of Moriguchi, Japan

[73] Assignee: Sanyo Electric Co., Ltd., Osaka, Japan

[21] Appl. No.: 711,852

[22] Filed: Sep. 10, 1996

[30] Foreign Application Priority Data

Sep. 11, 1995 [JP] Japan .................................. 7-232629
Sep. 11, 1995 [JP] Japan .................................. 7-232630

[51] Int. Cl.⁶ .................................................. G06F 11/00
[52] U.S. Cl. .............................................. 371/3; 370/242
[58] Field of Search ............................. 371/3, 8.1, 20.1,
371/21.6, 34, 35, 37.7, 37.02, 44, 22.33,
43.5, 49.1, 49.4, 38.1, 33, 37.04, 41, 48,
49.2; 370/474, 282, 252, 242; 380/43

[56] References Cited

U.S. PATENT DOCUMENTS

| | | | |
|---|---|---|---|
| 4,630,271 | 12/1986 | Yamada | 371/37 |
| 4,639,548 | 1/1987 | Oshima et al. | 380/43 |
| 4,723,246 | 2/1988 | Weldon, Jr. | 371/42 |
| 5,014,274 | 5/1991 | Higurashi et al. | 371/40.1 |
| 5,432,800 | 7/1995 | Kuroda et al. | 371/37.7 |
| 5,436,917 | 7/1995 | Karasawa | 371/37.4 |
| 5,608,738 | 3/1997 | Matsushita | 371/37.1 |
| 5,608,740 | 3/1997 | Watanabe | 371/37.4 |
| 5,671,226 | 9/1997 | Murakami et al. | 370/474 |

Primary Examiner—Albert DeCady
Assistant Examiner—Nadeem Iqbal
Attorney, Agent, or Firm—Loeb & Loeb LLP

[57] ABSTRACT

A scrambling key is generated from demodulated and error-corrected FM demodulation data for use in descrambling. During this process, if error correction has not been normally conducted to an object data packet, a subsequent descrambling operation is not executed to that data packet. In addition, a descrambling operation is not carried out if the object data packet is a parity packet.

19 Claims, 8 Drawing Sheets

DATA PROCESSING DEVICE FOR FM MULTI-CHANNEL BROADCASTING

BACKGROUND OF THE INVENTION

1. Field of the Invention

The present invention relates to a data processing device for FM multi-channel broadcasting and, in particular, to a construction which prohibits execution of data processing of data for which processing is unnecessary.

2. Description of the Prior Art

FM multi-channel broadcasting in which digital data (multiplex data) is multiplexed to FM broadcast waves has been put to practical use, wherein text data is transmitted. In this broadcasting, digital information is multiplexed onto a 76 kHz frequency band in a base band frequency, and a receiver extracts a signal from this frequency band so as to obtain multiplex data through demodulation.

Multiplex data, shown in FIG. 8, is transmitted for every block which comprises a 16 bit block identification (BIC), a 176 bit data packet, a 14 bit cyclic redundancy check (CRC), and a 82 bit parity. 272 blocks, each consisting of 288 bits as described above, together constitute one frame of data.

A 14 bit CRC and a 82 bit parity within one block are horizontal error correction codes which are used to correct errors occurred to a data packet in the block. On the other hand, a parity packet in the block identified by BIC4 is a vertical error correction code which is used to correct errors occurred to data held at identical bit positions in respective blocks. As described above, data correction for FM multi-channel broadcasting is made by using product codes consisting of vertical and horizontal codes.

An LSI for the above demodulation and error correction of multiplex data has been put to practical use in FM multiplex receivers.

The provision of traffic information via FM multi-channel broadcasting is being planned. For instance, consideration has been made regarding the idea of Vehicle Information and Communication System (VICS), in which a navigation system equipped to a vehicle receives traffic information transmitted in the form of digital data to utilize for route guidance or other purposes. As for the VICS service, it has been suggested that the service should be kept exclusively available to members by scrambling data.

A receiver used for the above scrambled FM multi-channel broadcasting may be constructed such that a demodulation and error correction LSI conducts demodulation and error correction to scrambled data, and another LSI descrambles the thus obtained data.

The above demodulation and error correction LSI is designed based on a concept that all packets, including invalid packets (packets whose errors cannot be corrected), are output to an application microcomputer. In other words, even when some data is detected as abnormal, that is, invalid, through error detection using a CRC code (that is, CRC is NG), the demodulation and error correction LSI outputs a data packet containing such invalid data including an error in the same manner as valid packets. A descrambling LSI accordingly descrambles such invalid data packets including data in the error correction, supplied by the demodulation and error correction LSI. That is, this arrangement may result in a wasted process in which an unusable, invalid data packet is subjected to descrambling.

Further, the above demodulation and error correction LSI outputs a block of a parity packet, similarly to blocks of other packets.

In FM multi-channel broadcasting, not all services are subjected to scrambling. Even in a scrambled service, not all data, but only predetermined parts, are subjected to scrambling. For instance, parity packets, which is for vertical error correction, are not scrambled in this method. Thus, descrambling a parity packet will actually result in scrambling the packet, which causes difficulties in subsequent use. It is therefore desirable that a descrambling LSI to output parity packets intact.

SUMMARY OF THE INVENTION

The present invention was conceived to overcome the above problems and thus aims to provide a data processing device for FM multi-channel broadcasting which is capable of appropriately executing data processing, such as descrambling.

According to the present invention, there is provided a data processing device for FM multi-channel broadcasting, comprising: judgement means for judging whether or not it is necessary to execute data processing to an object data packet; and process prohibition means for prohibiting execution of data processing when the judgement circuit judges that it is unnecessary to execute data processing to the object data packet.

As described above, data processing is not executed to an object data packet which does not require data processing, so that useless data processing can be avoided. In addition, unnecessary processing of usable intact data which may thereby become unusable can be prevented. For instance, it is possible to prevent a situation where data which is not originally scrambled is descrambled and made unusable.

According to one aspect of the present invention, there is provided a data processing device for FM multi-channel broadcasting comprising error correction judgement means for judging whether error correction has been successfully or erroneously made to an object data packet, and process prohibition means for prohibiting execution of data processing when the error correction judgement means judges that error correction has been erroneously made to the object data packet.

Processing an invalid data packet with erroneously corrected errors cannot provide valid data. Thus, execution of data processing to such an invalid data packet is unnecessary. According to the present invention, the process prohibition means can prohibit process execution to data without the need of being processed, so that power consumption for data processing can be conserved.

Further, the error correction judgement means can easily judge whether error correction has been successfully or erroneously made, based on a status code which has been attached to the data packet according to the result of detection using a CRC code of FM multiplex data.

In addition, the error correction judgement means sets a flag according to the status code, and the process prohibition circuit prohibits execution of data processing according to the flag.

The data processing device of the present invention further comprises a random number generator for generating a random number, so that it can process object data, utilizing a random number generated by this random number generator.

The random number generator is connected so as to give a predetermined change to data stored, and can be constituted including a plurality of registers for shifting data according to a clock supplied and a shift register for successively output of a random number from a given register.

The process prohibition circuit prohibits output of a random number from the random number generator by halting supply of a clock to the shift register.

Data processing according to the present invention comprises a process of descrambling a scrambled object data packet. When error correction is made erroneously, such invalid data cannot provide valid data when descrambled. Thus, the above arrangement can prohibit a descrambling operation from being executed to such invalid data with erroneously corrected errors.

According to an other aspect of the invention, there is provided a data processing device for use in a receiver for FM multi-channel broadcasting, wherein a plurality of packets constitute data frames, and a product code consisting of vertical and horizontal codes are used as a error correction code for the data frames, the data processing device further comprising: judgement means for judging whether an object data packet is a parity packet for a vertical error correction code or a packet for data, and process prohibition means for prohibiting execution of data processing when the judgement circuit judges that the object data packet is the parity packet.

A parity packet is not specially processed on a sender side. Thus, there is no need to execute special data processing to a parity packet. According to the present invention, the prohibition means can prohibit execution of useless data processing, so that packet data can be output in an effective state. Moreover, power consumption for data processing can be conserved.

The judgement means includes a register for storing a flag which indicates whether or not a data packet is a parity packet.

The process exhibition circuit judges whether or not a data packet is a parity packet, based on contents of the flag stored in a register.

Whether the data packet is a data packet or a parity packet for a vertical code is detectable, referring to a block identification code attached to respective data packets. Thus, the judgement circuit determines content of the flag stored in the register, based on the content of the block identification code attached to respective data packets.

A data processing device of the present invention further comprises a random number generator for generating a random number, wherein an object data packet is processed, utilizing a random number generated by this random number regenerator.

The random number generator is connected so as to give a predetermined change to stored data and includes a plurality of registers for shifting data according to a clock supplied and a shift register for successively outputting a random number from a given register.

The process prohibition circuit prohibits outpu of a random number from the random number generator by halting supply of a clock to the shift register.

The data processing comprises a process of descrambling a scrambled object data packet.

BRIEF DESCRIPTION OF THE DRAWINGS

The above and the other objects, features, and advantages will be further apparent from the following description of the preferred embodiment taken in conjunction with the accompanying drawings wherein.

DESCRIPTION OF THE PREFERRED EMBODIMENTS

Preferred embodiments of the present invention will next be described, based on the following drawings.

First Preferred Embodiment

Entire Construction

Figure 1:
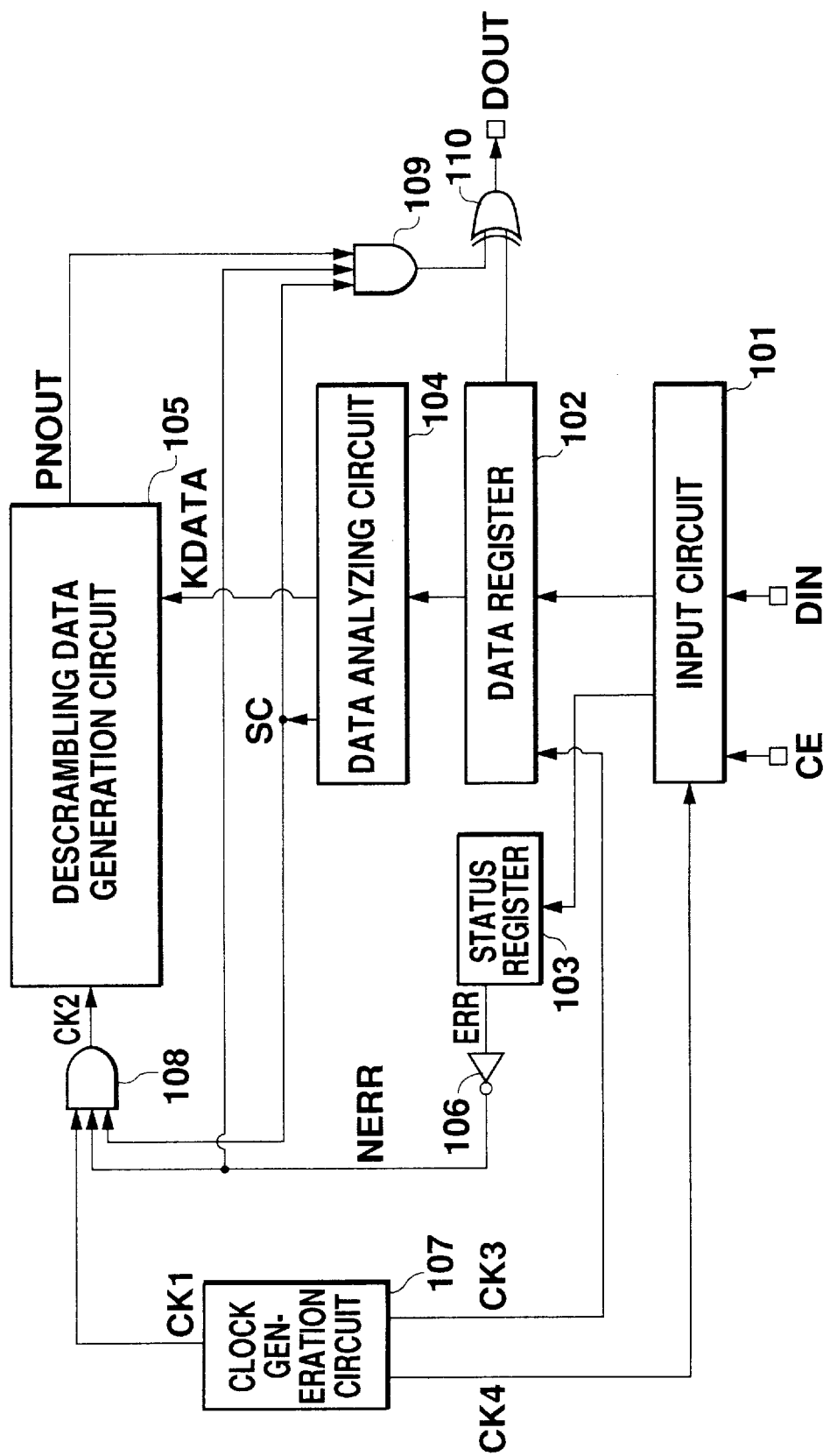
FIG. 1 is a block diagram showing the construction of a descrambling device according to a first preferred embodiment.

FIG. 1 is a block diagram showing the construction of a descrambling device according to a first preferred embodiment.

As is to be described later, FM multiplex data, after being received by a receiver, is sent to an FM multiplex decoder for demodulation. The data is further subjected to error correction in the horizontal direction of a data packet by using a 82 bit parity, and in the vertical direction of a data packet by using a parity packet. Subsequently, whether or not the correction has been successfully completed is examined using a 14 bit CRC. The FM multiplex decoder produces correction information (a status code) which indicates the content of error correction and attaches the information to the head of the corrected data so that the corrected data having the information attached to its head is output as demodulated data. In this event, the content of error correction includes the type of corrections ([VH], etc.), such as "corrected output in the horizontal direction only" or "corrected output in the horizontal and vertical direction," and the result of examination using a CRC code ([ERR], etc.), such as "normal (successful)" or "erroneous" error corrections.

The demodulated data, output from the FM multiplex decoder as described above, is supplied to an input circuit 101 via a data input terminal DIN of a descrambling device.

The input circuit 101 forwards the demodulated data to a data register 102 and to a status register 103. The status register 103 detects whether the ERR flag of the status code attached to the head of the demodulated data indicates "0" or "1," that is, whether error correction has been made "normally (successfully)" or "erroneously." In the case of an ERR flag "1," which means erroneous error correction, the ERR flag "1" is output as an error correction signal ERR "1." On the other hand, in the case of an ERR flag "0," which means normal error correction, the ERR flag "0" is output intact as an error correction signal ERR "0."

Meanwhile, the data register 102 temporarily holds the demodulated data, supplied from the input circuit 101, and outputs the held data to a data analyzing circuit 104. The data analyzing circuit 104 detects whether or not the supplied data is scrambled, referring to the content of the data, and outputs a signal SC which indicates whether or not a descrambling operation is necessary. The data analyzing circuit 104 also generates a scrambling key (KDATA) from key data contained in the data for output, the KDATA being necessary for descrambling. In this embodiment, key data is contained for every packet, so that different scrambling keys are generated for every packet.

The KDATA is supplied to a descrambled data generation circuit 105, which in turn generates a descrambling code PNOUT, based on the KDATA. In this embodiment, the descrambled data generation circuit 105, which includes a random number generator utilizing a shift register, generates a random number while sequentially shifting values of the shift register and thereby obtains a descrambling code PNOUT. For the generation of a random number, the shift register uses the KDATA as an initial value.

An invertor 106, receiving an error correction signal ERR from the status register 103, inverts the signal ERR and outputs an inverted error correction signal NERR. The inverted error correction signal NERR indicates a result of detection by the status register 103 as to whether error correction has been made normally or erroneously, that is, a signal "0" for normal error correction, while a signal "1" for erroneous error correction. A clock generation circuit 107 generates three synchronous clocks CK4, CK3, and CK1 and supplies them to the input circuit 101, a data register 102, and an AND gate 108, respectively.

The AND gate 108, which also receives an SC signal from the data analyzing circuit 104 and an NERR signal from the invertor 106, obtains a logical AND of the CK1, NERR, and SC signals and supplies the obtained logical AND to the descrambling data generation circuit 105 as a clock CK2 which indicates whether or not descrambling is necessary.

Upon receipt of the clock CK2 from the AND gate 108, the descrambled data generation circuit 105 outputs a descrambling code PNOUT, generated based on a scrambling key, to an AND data 109.

The AND gate 109, which also receives an NERR signal from the invertor 106 and an SC signal from the data analyzing circuit 104 in addition to the PNOUT, obtains a logical AND of these signals and thereby outputs a descrambling code PNOUT only in cases of scrambled data containing parity data with normally corrected errors.

Receiving outputs of the AND gate 109 and of the data register 102, the exclusive OR gate 110 obtains an exclusive OR of both the supplied outputs. Meanwhile, the input circuit 101 and the data register 102 receive clocks CK4 and CK3, respectively, from the clock generation circuit 107, which control data intakes of these circuit 101 and register 102, while the descrambled data generation circuit 105 also receives an identical CK2 from the clock generation circuit 107. Thus, these circuits, i.e., the input circuit 101, the data register 102, and the descrambled data generation circuit 105, all operate in synchronism with one another. As a result of this synchronism, the PNOUT is successively added bit by bit to respective bits of the input data from the data register 102, that is, an exclusive OR is obtained, whereby descrambled data DOUT is obtained at the output of the exclusive OR gate 110.

As described above, in this preferred embodiment, the status register 103 judges whether error correction has been made normally or erroneously, and an NERR "0" is supplied to the AND gate 108 if error correction was made erroneously. Upon receipt of the ENRR "0," the descrambled data generation circuit 105 stops operating, whereby no scrambling code PNOUT is output. Accordingly, no PNOUT is output from the AND gate 109, which causes the exclusive OR gate 110 to output data intact. That is, no descrambling operation is carried out to parity data to which error correction has been made erroneously, so that such parity data is output intact to an application microcomputer.

As described above, when error correction has failed (that is, NG), the descrambled data generation circuit 105 stops operating, including data shifting, as described above, so that power consumption can be conserved, particularly in cases where a scrambled data generation circuit 105, etc., comprises a CMOS device, or the like.

Operation

Figure 2:
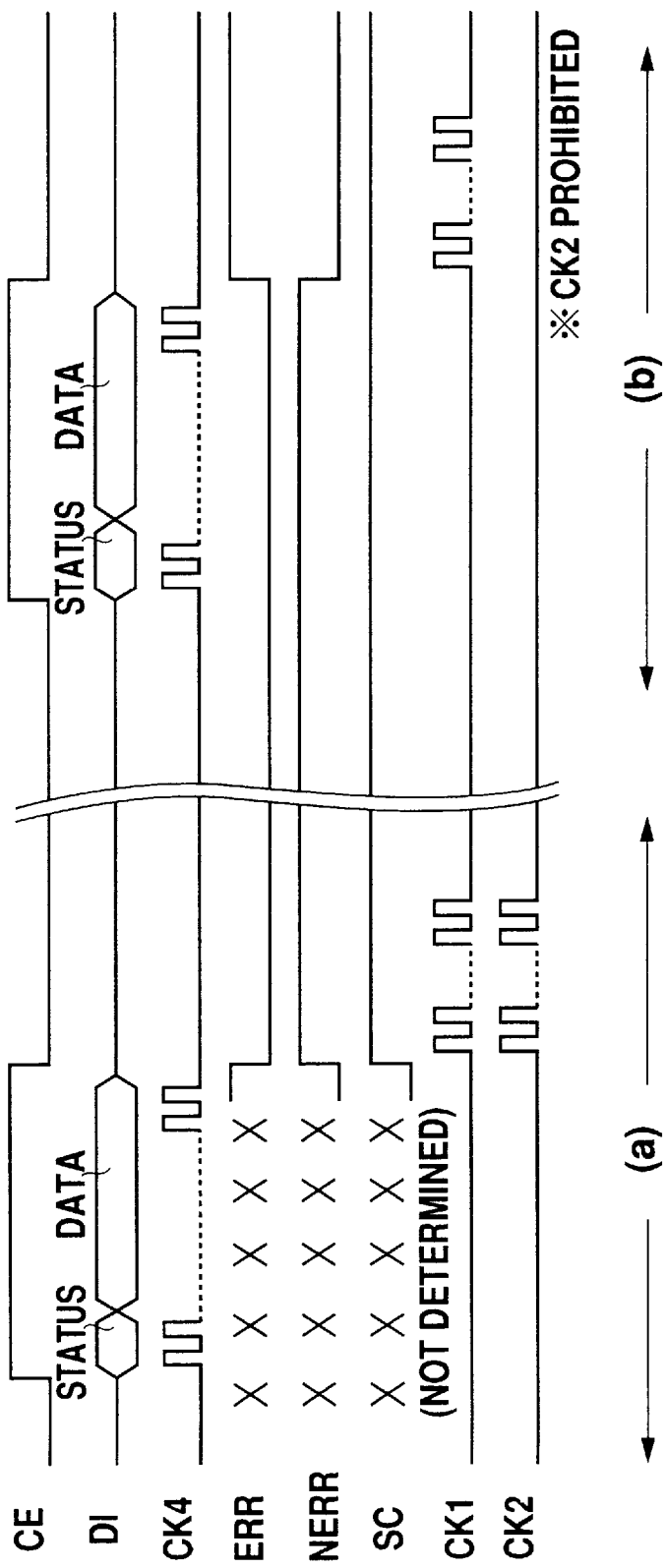
FIG. 2 is a timing chart showing an operational timing of the first preferred embodiment.

FIG. 2 shows an operational timing chart for the first preferred embodiment. Referring to the left half period (a), when a chip enable CE becomes "1," and the input circuit 101 is thereby ready for data intake, the input circuit 101 takes in one block of data in response to a clock CK4 and holds the data in the data register 102. With reference to the ERR flag of the status code at the head of the block data, the status register 103 confirms and outputs the error correction signal ERR when an entire single data block is completely input. During the period (a) in FIG. 2, when the ERR flag of a status code is "0," which means execution of a normal error correction, the status register 103 outputs an error correction signal ERR "0," and an NERR "1" is accordingly supplied to the AND gate 108. Thereupon, a clock CK2 is output to the descrambled data generation circuit 105, which in turn outputs a descrambling code PNOUT. Meanwhile, a scrambling key KDATA, which was confirmed according to data content, is supplied from the data analyzing circuit 104 to a shift register of the descrambled data generation circuit 105 so as to be set therein as an initial value at the time when data input is completed. At this stage, a signal SC is set as "1."

Because a clock CK3 is output in synchronism with a clock CK1, the exclusive OR gate 110 can conduct an accurate descrambling operation. A packet or a part of a packet which is not scrambled is controlled according to the SC signal from the data analyzing circuit 104. As a result, the descrambled data generation circuit 105 generates a descrambling code PNOUT which corresponds to the scrambling operation conducted on the sender side.

Further, during the other half period (b) of FIG. 2, when the status register 103 judges, with reference to the status code at the head of demodulate data, that error correction was made erroneously, the status register 103 outputs an error correction signal ERR "1." The AND gate 108 accordingly receives an NERR signal "0." As a result, no clock CK2 is supplied to the descrambled data generation circuit 105, thereby halting descrambling data generation operations.

Second Preferred Embodiment

Entire Construction

Figure 3:
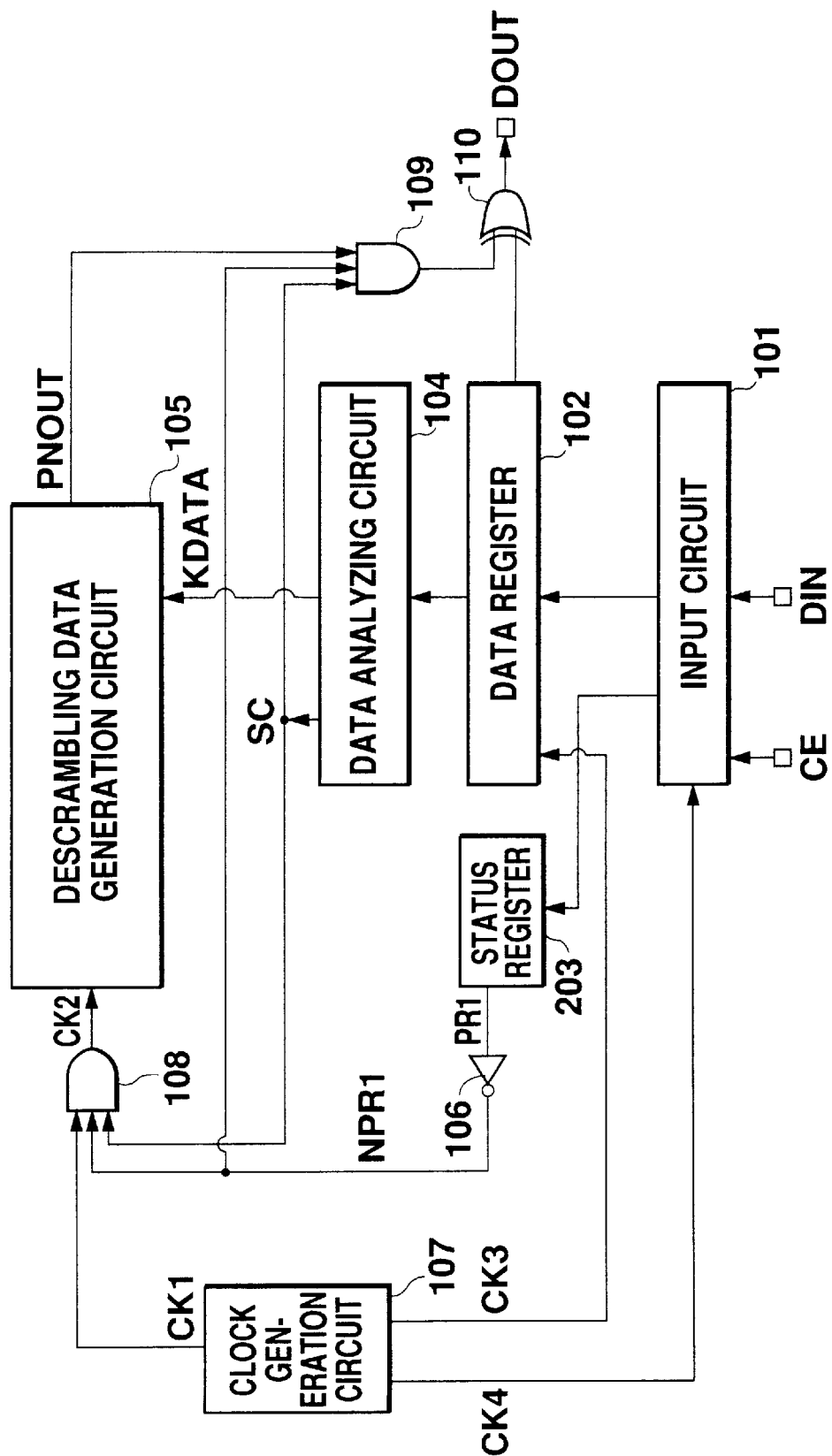
FIG. 3 is a block diagram showing the construction of a descrambling device according to a second preferred embodiment.

FIG. 3 is a block diagram showing the construction of a second preferred embodiment, in which the status register 103 according to the first embodiment is replaced by a status register 203. The input circuit 101 supplies input data to the data register 102. In addition, the input circuit 101 also extracts a status flag PRI from the input data and supplies the extracted flag to the status register 203, the status flag PRI indicating whether or not the concerned data packet is a parity packet. The status register 203, which stores the supplied flag, outputs the content of the flag as a signal PRI. Note that whether or not an object block is a parity packet can be detected from a block identification attached to the head of transmission data. That is, a block having a block identification BIC4 is a parity packet. This detection is made so as to attach an according flag to data during demodulation and error correction process.

In this embodiment, the AND gate 109 receives a signal NPRI in lieu of a signal NERR according to the first embodiment, a signal SC from the data analyzing circuit 104, and a PNOUT from the descrambled data generation circuit 105, wherein the signal NPRI is formed by inverting via the invertor 106 a signal PRI from the status register 203. The signal SC indicates whether or not the concerned block parity data is scrambled. The AND gate 109 obtains a logical AND of these three signals and thereby outputs a descrambling code PNOUT only for scrambled data, but not a parity packet.

According to the second preferred embodiment, the status register 203 judges whether or not an input packet is a parity packet, and, in the case of a parity packet, a signal NPRI "0" is supplied to the AND gate 108. Upon receipt of the signal "0," the descrambled data generation circuit 105 stops operating and thereby outputs no scrambling code PNOUT. As a result, no PNOUT is output from the AND gate 109, which causes the exclusive OR gate 110 to output data intact, including parity data intact in an effective state. The output data is supplied to an application microcomputer, where parity data can be utilized. In addition, with this arrangement, power consumption can particularly be conserved in cases where the circuit comprises a CMOS device, as the descrambled data generation circuit 105 halts wasteful operations, including data shifting.

Operation

Figure 4:
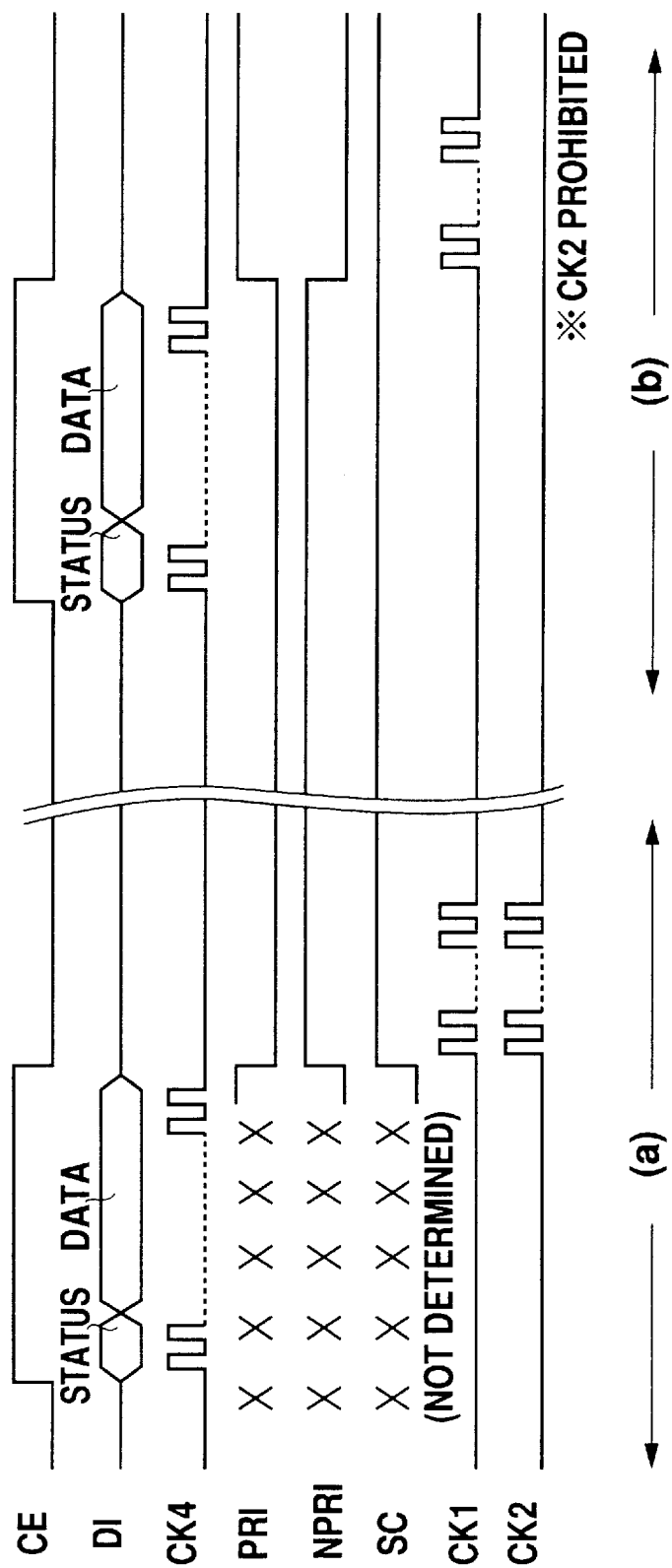
FIG. 4 is a timing chart showing an operational timing of the second preferred embodiment.

FIG. 4 shows an operational timing chart for the second preferred embodiment, in which the entire operation is identical to that of the first embodiment except that signals PRI and NPRI are output in place of signals ERR and NERR of the first embodiment.

That is, an input data block has, at its head, a status flag PRI which has been set according to a block identification data BIC. A status flag PRI "1" indicates that a parity packet is contained in the input data block. Referring to the status flag PRI, the status register 203 detects whether or not the input data block contains a parity packet. After confirming the detection result, the status register 203 outputs the confirmed result when the input of one entire data block is finished. In FIG. 4, the left half period (a) of the timing chart relates to an operation for a block which does not include a parity packet. During this period, the PRI "0" is output so that the AND gate 108 receives an NPRI "1." As a result, the AND gate 108 outputs a clock CK2 to the descrambled data generation circuit 105, which in turn outputs a descrambling signal PNOUT.

On the other hand, the other half period (b) shows an operation for a parity packet, in which the status register 203 outputs a PRI "1," judging that the input block is a parity packet, based on the content of the status flag. As a result, receiving a signal NPRI "0," the AND gate 108 does not output a CK2 signal to the descrambled data generation circuit 105, which then halts its operation.

CONSTRUCTION OF INDIVIDUAL CIRCUIT

Construction of Descrambled Data Generation Circuit

Figure 5:
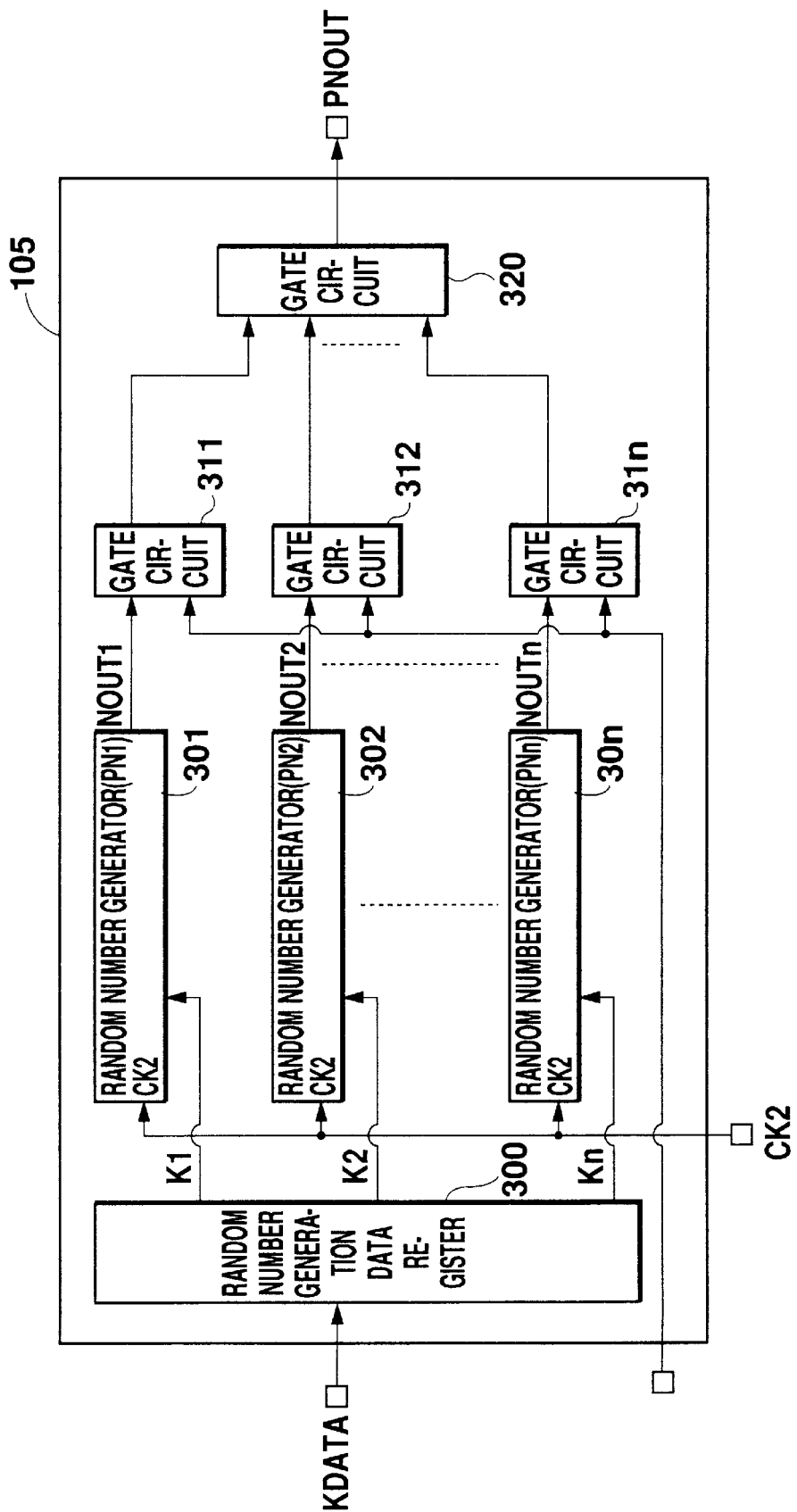
FIG. 5 is a block diagram showing the construction of a descrambled data generation circuit.

FIG. 5 shows an example of the construction of the descrambled data generation circuit 105 shown in FIG. 2. A scrambling key (KDATA) is input into a random number generation data register 300 to be held therein. Data k1, k2 ... Kn which are held at given parts of the random number generation data register 300 are supplied to n random number generator 301–30n, respectively. The random number generators 301–30n each consist of shift registers, to which a clock CK2 is supplied. In response to the clock CK2, the random number generators 301–30n respectively output random numbers NOUT1-NOUTn which correspond to respective initial values. The random numbers NOUT1-NOUTn are supplied to the gate circuits 311–31n, respectively. Each of the gate circuits 311–31n, comprising a logical circuit, such as an AND or OR circuit, also receives a correction control data comprising a part (e.g., 4 bits) of a data packet number contained in each packet, so that the random numbers NOUT1-NOUTn are corrected in the respective gate circuits 311–31n.

These respective gate circuits 311–31n supply their outputs to a gate circuit 320, where all the outputs are added for every bit so that a descrambling code PNOUT is output for every bit.

In the above construction, a given descrambling code PN is obtained from a scrambling key. In this event, no supply of a clock CK2 will halt the operation of the random number generators 301–30n, which in turn results in no output of PNOUT, thereby prohibiting execution of a useless descrambling operation.

Figure 6:
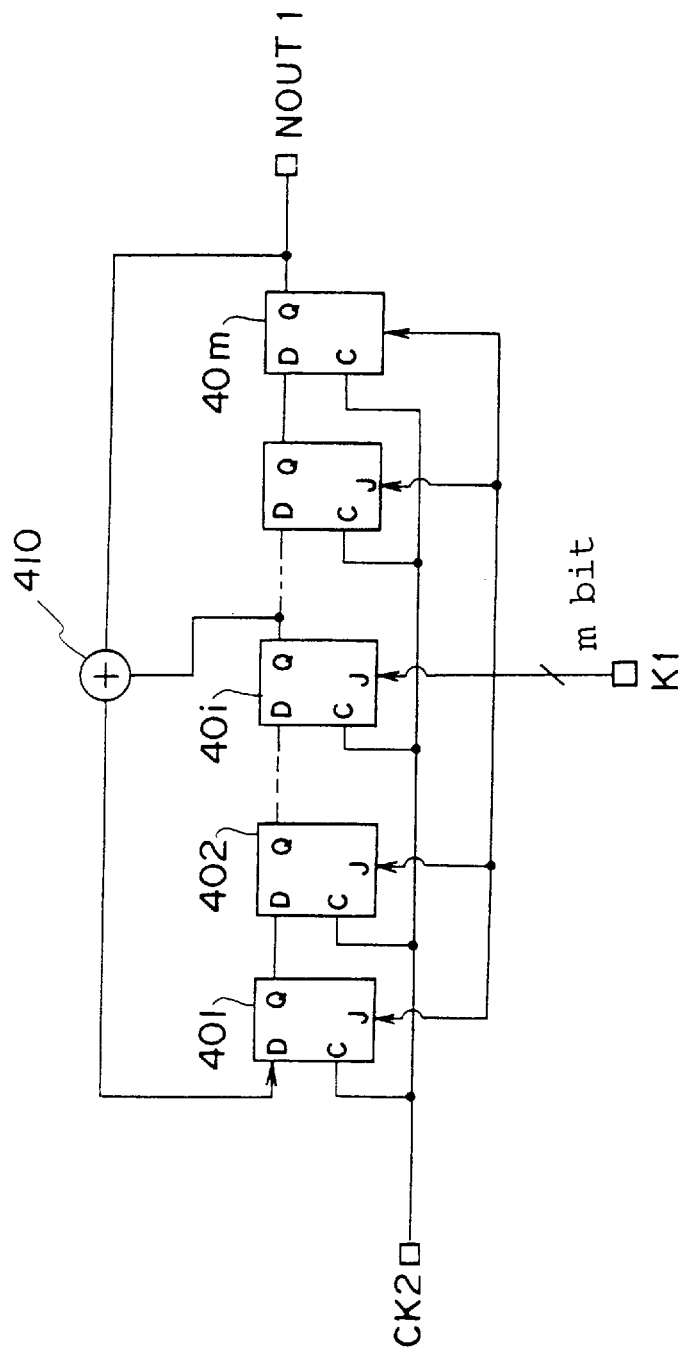
FIG. 6 is a block diagram showing the construction of a random number generator.

FIG. 6 shows an example of the construction of a random number generator 301–30n. In this drawing, m shift registers 401–40m are provided such that an output Q of a shift register is supplied to its subsequent shift register via the input D thereof, and the output of the last shift register is supplied to the first shift register via the input D thereof through an exclusive OR gate 410. Further, the exclusive OR gate 410 receives, at its other end, an output Q of one predetermined shift register 40i (i is either one of the numbers between 1 and m) of the shift registers 401–40m.

Each shift register, supplied m bit scrambling key data k (k1 in FIG. 6), takes in the data k (k1 in FIG. 6) as an initial value in response to a load signal (LOAD). Receiving a clock CK2, each shift register shifts data in response to the clock CK2 and thereby provides a given output NOUT (NOUT1 in FIG. 6).

Other Construction

The foregoing descrambling code PNOUT must be identical to a scrambling code which is used on a sender side. The construction for determining the value of a scrambling code on a sender side is identical to that for determining the value of a descrambling code on a receiver side.

Among a variety of VICS services, there may be some services where no scrambling is preferred. Those services may be transmitted without being scrambled. Thus, it is preferable to control a descrambling operation in accordance with the content of service identification data in a prefix attached to the head of a data packet. That is, for given service identifications (which represent services without being scrambled), the data analyzing circuit 104 outputs a signal SC "0" so as to prevent generation of a descrambling code PNOUT.

The foregoing data processing method is adaptable to descrambling for the Differential Global Positioning System (DGPS), Game Communication (G-COM), or the like.

Construction of Receiver for FM Multi-channel Broadcasting

Figure 7:
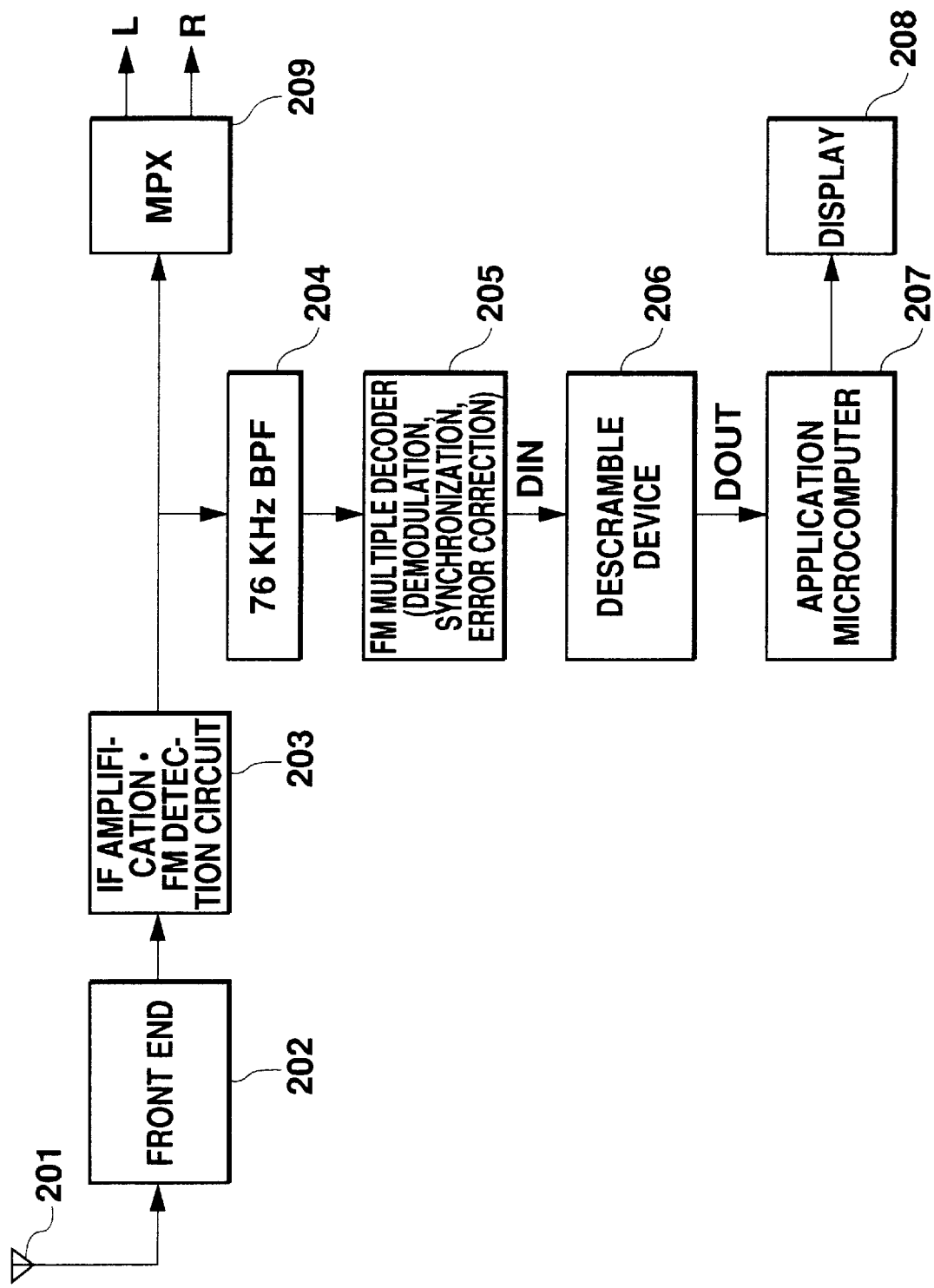
FIG. 7 shows the construction of a receiver for FM multi-channel broadcasting.
Figure 8:
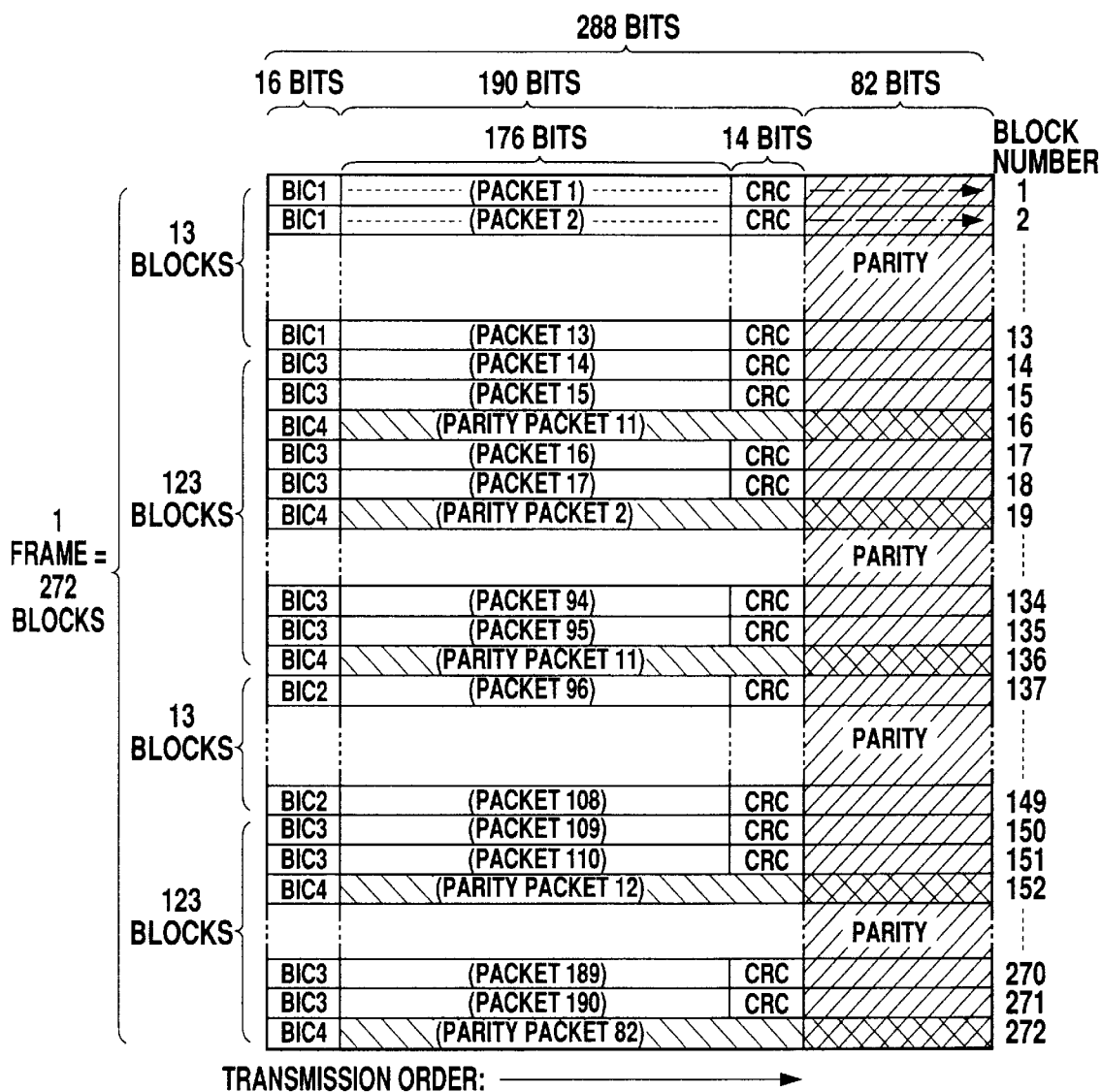
FIG. 8 shows the frame construction of FM multiplex data.

FIG. 7 is a block diagram showing the construction of a receiver for FM multi-channel broadcasting, the receiver being provided with the descrambling device shown in either FIG. 1 or FIG. 3.

When an antenna 201 receives radio waves, a front end 202 extracts desired FM multi-channel broadcasting as an intermediate frequency (IF) from among the received waves.

The IF is then subjected to amplification and detection by an IF amplification FM detection circuit 203. For normal FM broadcasting, a multiplexer 209 forms L and R signals, based on the detection signal from the IF amplification and FM detection circuit 203, and supplied the signals to a speaker for stereo output.

The detection signal from the IF amplification and FM detection circuit 203 is also supplied to a 76 kHz band pass filter (BPF) 204. For receipt of FM multi-channel broadcasting, 76 kHz FM multiplex data is extracted via the BPF 204 and supplied to an FM multiplex decoder 205. The FM multiplex decoder 205 demodulates the FM multiplex data received as above and further carries out data correction in the horizontal direction with respect to respective blocks and in the vertical direction with respect to the frame to the received data.

Demodulated data with errors corrected is input into the descrambling device 206 shown in either FIG. 1 or FIG. 3, via a data input terminal DIN thereof, where a descrambling operation is carried out only to a data packet which has undergone normal error correction. Descrambled data packet is output via an data output terminal DOUT to an application microcomputer 207, which then prepares an image signal in response to the supplied descrambled data, so that programs of desired FM multi-channel broadcasting, such as traffic information, are displayed in a display 208.

What is claimed is:

1. A data processing device for FM multi-channel broadcasting, processing FM multi-channel data depending on a status of the FM multi-channel data, the data processing device comprising:

an input section for receiving the FM multi-channel data having a judgment signal regarding the status of the FM multi-channel data, wherein the FM multi-channel data have been error corrected;

a judgment circuit connected to the input section, wherein the judgment circuit processes the FM multi-channel data from the input section and outputs the judgment signal indicating the status of the FM multi-channel data, wherein the judgment signal maintains one of a first state and a second state;

a descrambling data generation circuit connected to the judgment circuit and is responsive to the judgment signal, wherein the descrambling data generation circuit generates a descrambling code in response to the FM multi-channel data when the judgment signal is at the first state and does not generate the descrambling code when the judgment signal is at the second state; and a logical output circuit for descrambling the FM multi-channel data in response to the descrambling code from the descrambling data generation circuit.

2. A data processing device according to claim 1, wherein the judgment signal indicates whether error correction was performed properly or erroneously with the FM multi-channel data, and the descrambling data generating circuit is halted so that the FM multi-channel data in the input section is outputted from the logical output circuit intact when the judgment signal is in the second state which represents that the error correction was improperly performed.

3. A data processing device according to claim 1, wherein the judgment signal indicates whether the FM multi-channel data comprises a parity packet, and the descrambling data generation circuit is halted so that the parity packet of the FM multi-channel data in the input section is outputted intact from the logical output circuit when the judgment signal is in the second state which represents that the FM multi-channel data is the parity packet.

4. A data processing device according to claim 2, further comprising:

a clock generation controlling circuit for generating a clock when the judgment signal is at the first state and prohibits generation of the clock when the judgment signal is at the second state, wherein the descrambled data generation circuit operates in response to the clock.

5. A data processing device according to claim 1, further comprising a random number generator for generating a random number, wherein the data processing device processes the FM multi-channel data utilizing the random number generated by the random number generator.

6. A data processing device according to claim 5, wherein the random number generator operates in response to a scrambling key included in the FM multi-channel data and includes a plurality of registers for shifting data according to the clock supplied from the clock generation controlling circuit and a shift register for successively outputting the random number from the shift register, and the clock generation controlling circuit prohibits output of the random number from the random number generator by halting supply of the clock to the shift register.

7. A data processing device according to claim 1, wherein the FM multi-channel data comprises data frames comprising a plurality of data packets, and uses a product code comprising vertical and horizontal codes as an error correction code for the data frames, the judgment circuit judges whether the data packet is a parity packet for a vertical error correction code or a packet for data, and the clock generation controlling circuit in response to the judgment circuit prohibits data processing when the judgment circuit judges that the data packet is the parity packet.

8. A data processing device according to claim 7, wherein the judgment circuit includes a register for storing a flag indicating whether or not the data packet is the parity packet.

9. A data processing device according to claim 7, wherein the judgment circuit determines content of the flag stored in the register based on the content of a block identification code included in the data packet.

10. A data processing device according to claim 7, further comprising a random number generator for generating a random number, wherein the data packet is processed utilizing the random number generated by the random number regenerator.

11. A data processing device according to claim 10, wherein the random number generator operates in response to a scrambling key included in the FM multi-channel data and includes a plurality of registers for shifting data according to the clock supplied from the clock generation controlling circuit and a shift register for successively outputting the random number from the shift register, and the clock generation controlling circuit prohibits output of the random number from the random number generator by halting supply of the clock to the shift register.

12. A data processing device according to claim 7, wherein the data processing comprises a process for descrambling a scrambled object data packet.

13. A data processing device of claim 3, further comprising:
a clock generation controlling circuit for generating a clock when the judgment signal is at the first state and prohibits generation of the clock when the judgment signal is at the second state, wherein the descrambling data generation circuit operates in response to the clock.

14. A data processing device for processing a FM multi-channel broadcasting signal containing FM multi-channel data, the data processing device comprising:
an input circuit containing the FM multi-channel data, the FM multi-channel data comprising a judgment signal signifying a data status of the FM multi-channel data;
a judgment circuit connected to the input circuit, the judgment circuit outputting the judgment signal which indicates the data status of the FM multi-channel data, wherein the judgment signal maintains one of a first state and a second state; and
a descrambling data generation circuit operating in response to the judgment signal, wherein the descrambling data generation circuit generates a descrambling code in response to the FM multi-channel data when the judgment signal is at the first state and does not generate the descrambling code when the judgment signal is at the second state.

15. A data processing device of claim 14, further comprising an output logic circuit responsive to the FM multi-channel data and the descrambling code to output descrambled FM multi-channel data when the judgment signal is at the first state.

16. A data processing device of claim 14, further comprising a clock logic circuit operates in response to a clock signal and the judgment signal to output the clock signal when the judgment signal is at the first state.

17. A data processing device of claim 14, wherein the judgment signal is at the second state when the FM multi-channel data contains erroneous data, and wherein the descrambling data generating circuit does not generate the descrambling code when the judgment signal is at the second state.

18. A data processing device of claim 14, the FM multi-channel data including a parity packet and a data packet, wherein the judgment signal is at the second state when processing the parity packet so that the descrambling data generating circuit does not generate the descrambling code.

19. A receiver for processing a FM multi-channel broadcasting signal containing FM multi-channel data, the receiver comprising:
an antenna for receiving the FM multi-channel broadcasting signal;
a front end circuit for converting the FM multi-channel broadcasting signal to an IF signal;
an decoder circuit for extracting the FM multi-channel data from the IF signal and performing error correction;
an input circuit receiving the FM multi-channel data, the FM multi-channel data comprising a judgment signal signifying a data status of the FM multi-channel data;
a judgment circuit connected to the input circuit, the judgment circuit outputting the judgment signal which indicates the data status of the FM multi-channel data, wherein the judgment signal maintains one of a first state and a second state; and
a descrambling data generation circuit operating in response to the judgment signal, wherein the descrambling data generation circuit generates a descrambling code in response to the FM multi-channel data when the judgment signal is at the first state and does not generate the descrambling code when the judgment signal is at the second state.

* * * * *